(12) United States Patent
Benson

(10) Patent No.: US 8,432,496 B2
(45) Date of Patent: Apr. 30, 2013

(54) AUTO CHANNEL ASSIGNMENT FOR LIVE PRODUCTIONS

(75) Inventor: John R. Benson, Jacksonville, FL (US)

(73) Assignee: Thomson Licensing, Boulogne-Billancourt (FR)

( * ) Notice: Subject to any disclaimer, the term of this patent is extended or adjusted under 35 U.S.C. 154(b) by 250 days.

(21) Appl. No.: 12/736,448

(22) PCT Filed: Dec. 23, 2008

(86) PCT No.: PCT/US2008/014004
§ 371 (c)(1),
(2), (4) Date: Dec. 10, 2010

(87) PCT Pub. No.: WO2009/126130
PCT Pub. Date: Oct. 15, 2009

(65) Prior Publication Data
US 2011/0122321 A1    May 26, 2011

Related U.S. Application Data

(60) Provisional application No. 61/123,915, filed on Apr. 11, 2008.

(51) Int. Cl.
*H04N 5/222* (2006.01)
(52) U.S. Cl.
USPC .......................................... 348/722; 348/564
(58) Field of Classification Search ............. 348/722, 348/515, 516, 563–564, 569, 554–555; 345/704, 345/723, 716–717, 719, 722, 724–726, 730–732; 707/503, 101–102, 104, 500.1; *H04N 5/222*
See application file for complete search history.

(56) References Cited

U.S. PATENT DOCUMENTS

| | | | |
|---|---|---|---|
| 5,311,423 A | 5/1994 | Clark | |
| 6,452,612 B1 * | 9/2002 | Holtz et al. | 715/723 |
| 6,807,676 B1 * | 10/2004 | Robbins et al. | 725/39 |
| 8,051,130 B2 * | 11/2011 | Logan et al. | 709/204 |
| 2007/0033612 A1 | 2/2007 | Lerman et al. | |

FOREIGN PATENT DOCUMENTS

| | | |
|---|---|---|
| CA | 2322909 | 4/2001 |
| CA | 2322909 C | 5/2007 |
| WO | WO 0152526 | 7/2001 |
| WO | WO0152526 A2 | 7/2001 |
| WO | WO03096682 A1 | 11/2003 |

OTHER PUBLICATIONS

Grass Valley; "Kalypso Video Production Center", User Manual, Thomson Brand, Software Version 11.0, Mar. 2005, pp. 1-312, XP002433704.
International Search Report Dated Mar. 30, 2009.

\* cited by examiner

*Primary Examiner* — Trang U Tran
(74) *Attorney, Agent, or Firm* — Robert D. Shedd; Robert B. Levy

(57) ABSTRACT

A method for auto channel assignment in a live television production system allows the user to assign physical play out channels to an auto pool of channels. The user need only create a single transition macro event (TME) template, which at the time of playout, causes the production system to assign an available channel from the auto pool of channels, without requiring any further user intervention.

5 Claims, 8 Drawing Sheets

Example of Sequence of Events "Look Ahead" Load – (Sequential Operation - Max limit look ahead set to 2).
(A) Event 1: ( -Chan1 is assigned to first TME.  Chan2 & -Chan3 are assigned to the next TME's.)
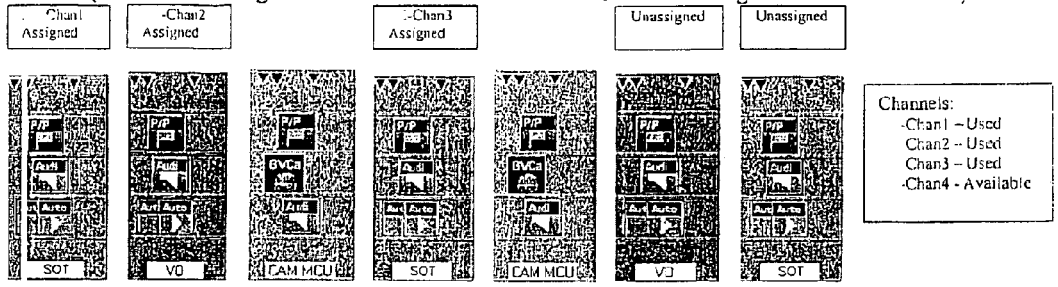
(B) Event 2: ( -Chan1 is "In-Use" while "On-air".  -Chan4 is assigned to the next TME.)
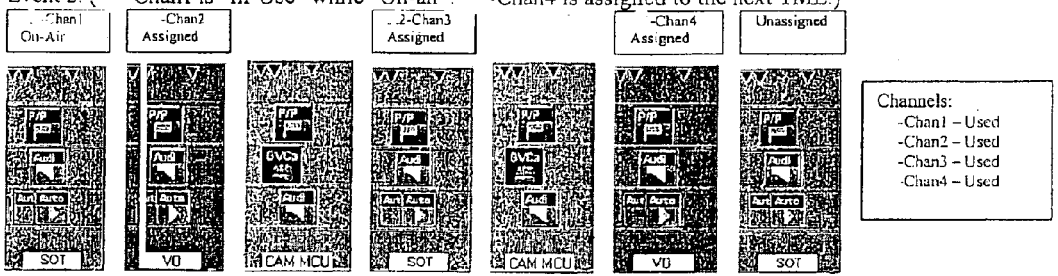
FIG. 5 A and B

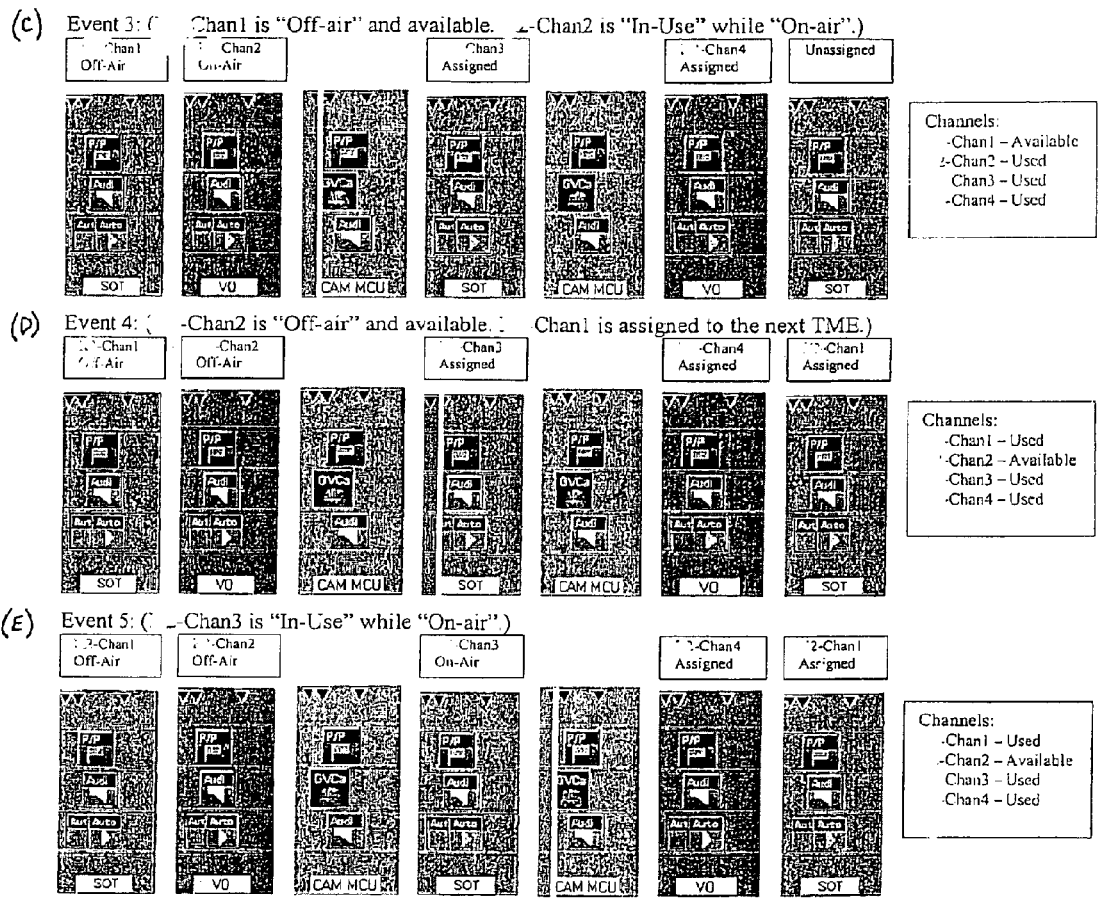
FIG. 5 C-E

Sequence of Events "Look Ahead" Load – (Non-sequential Operation).

(A) Event 1: (Chan1 is assigned to first TME. -Chan2 & -Chan3 are assigned to the next TME's.)

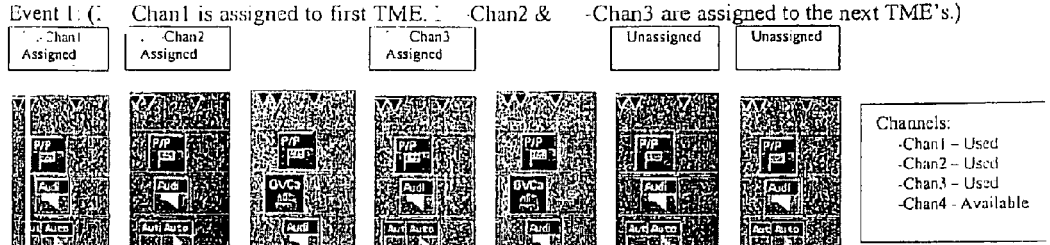

(B) Event 2: (K2-Chan1 is "In-Use" while "On-air". -Chan4 is assigned to the next TME.)

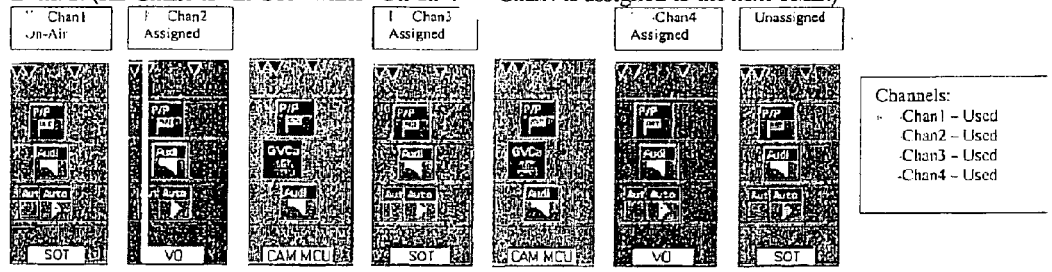

(C) Event 3: (Skips to TME 4. -Chan1 is "In-Use" while "On-air". -Chan2 is to the left of the timeline cursor and is available. -Chan3 is already assigned. -Chan4 is already assigned.)

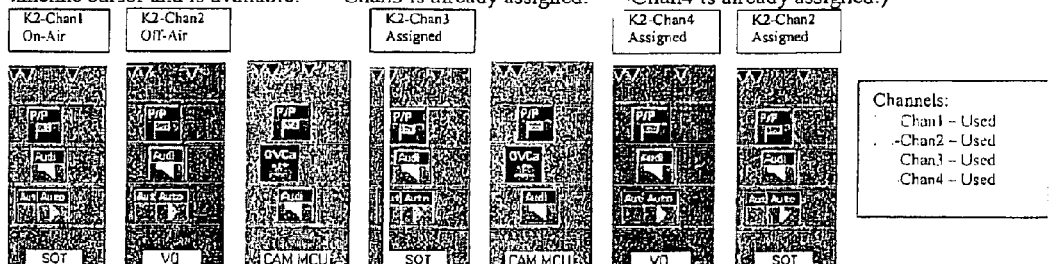

FIG. 6 A-C (A) Alternate Event 3. (Skips to TME 7. -Chan1 is "In-Use" while "On-air". Chan2, Chan3, -Chan4 are to the left of the timeline cursor and are available. -Chan2 is assigned.)
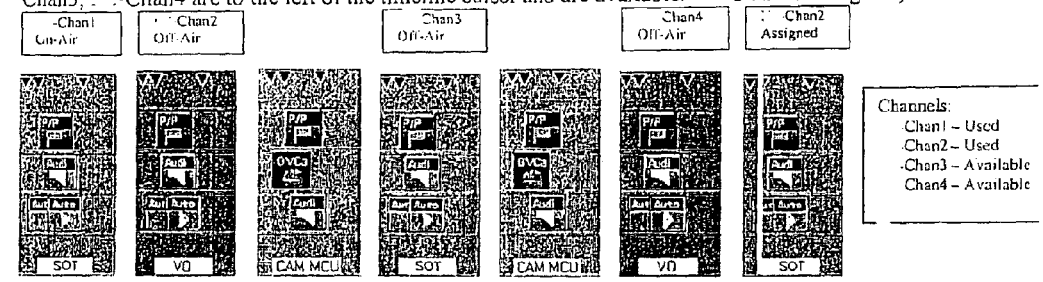
(B) Alternate Event 4: (Skips back to TME 2. Chan2-4 become available and are assigned.)
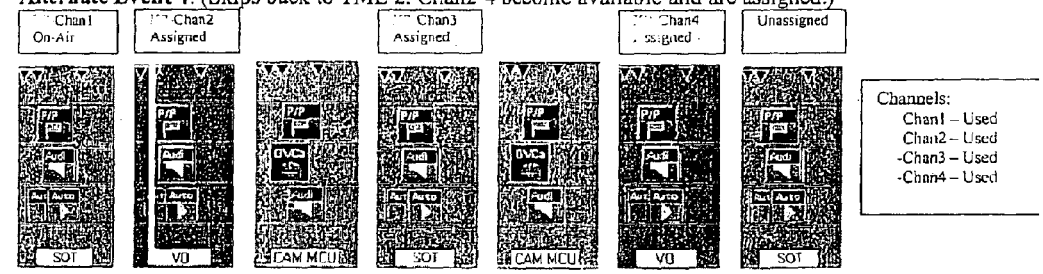
FIG. 7 A and B

AUTO CHANNEL ASSIGNMENT FOR LIVE PRODUCTIONS

CROSS REFERENCE TO RELATED APPLICATIONS

This application claims the benefit, under 35 U.S.C. §365 of International Application PCT/US2008/14004, filed Dec. 23, 2008, which was published in accordance with PCT Article 21(2) on Oct. 15, 2009 in English and which claims the benefit of U.S. provisional patent application No. 61/123, 915, filed Apr. 11, 2008.

TECHNICAL FIELD

The present invention relates to television production. More particularly, it relates to audio channel assignment in television productions, such as, for example, live news production.

BACKGROUND ART

In television production, and in particular live news productions, the number of combinations of video, audio, effects and other devices needed to create the unique events that are required to create a TV news program can easily number in the thousands.

The current operation of production systems, such as, for example, the IGNITE® production system available from Thomson Grass Valley, Jacksonville, Fla., requires the user to create multiple TME (Transition Macro Event) types and assign appropriate fields to match the play out channel that is assigned. For example if the user creates a SOT (Sound on Tape) TME, the user would have to create multiple SOT TMEs for each server play out channel. Those of skill in the art will recognize that various known acronyms used, such as for example, SOT (Sound on Tape), VO (Voice Over—meaning a live source will read over the clip.), NAT (Natural Sound—meaning that a live source will read over a clip that has natural sound under). There are other examples used, such as NAT/SOT (Natural Sound on a portion of the clip followed by sound full), PKG (Package—usually means a sound full tape that has the reporter track as well).

The user would assign the various servers TME to the appropriate stories, alternating between server channels to avoid back-to-back channels. If changes are made to the rundown order, then the user is required to manually manage the order of these TMEs. Because the clip identification (ID) is embedded into the TME (which is fixed to play out a set server channel) it is not easy to alter the play out channel from known productions systems such as IGNITE® (i.e., one would have to open multiple pages and change the appropriate fields to reflect the new channel. If one were to insert a Late Breaking news (LBN) item for the new server channel, one would not have the clip ID). Those of skill in the art will recognize that LBN constitutes is a TME. The production system Event Timeline is populated with production events by either opening a file or from entering TME/IQT data in the Newsroom Computer System (NCS). Thus, the LBN is TME that can be assigned to a button on the production system Graphical User Interface (GUI) or on a button on the production system automation panel. Note: TME & LBN are production macros, which consist of a group of actions that perform various production tasks, such as video switching, audio mixing, video server control, graphics control, camera control.

BRIEF SUMMARY OF THE INVENTION

According to one aspect of the present invention, auto channel assignment allows the user to assign physical play out channels to an auto pool. Using the capabilities of production system templates (e.g., automated production system templates); the user would create a single transition macro event (TME) template and, at the time of play out, an available channel will be assigned by the production system from the auto pool.

According to an implementation the method for assigning channels in an automated production apparatus for use by devices within the automated production apparatus includes receiving a user designation of a device within the automated production apparatus, reserving a pool of channels for use by the user-designated device and automatically selecting from the pool of reserved channels a channel for use by the device in response to a control event causing execution of at least operation by the device.

Other aspects and features of the present principles will become apparent from the following detailed description considered in conjunction with the accompanying drawings. It is to be understood, however, that the drawings are designed solely for purposes of illustration and not as a definition of the limits of the present principles, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

In the drawings wherein like reference numerals denote similar components throughout the views:

FIGS. 5a-5e depict examples of the sequence of events with a look ahead feature for sequential operations according to an implementation of the present invention;

FIGS. 6a-6c depict examples of the sequence of events with a look ahead feature for non-sequential operations according to an implementation of the present invention; and FIGS. 7a-7b depict alternative examples of the sequence of events with a look ahead feature for non-sequential operations, according to an implementation of the present invention.

DETAILED DESCRIPTION

The present principles provide an auto channel assignment system that allows the user to designate a pool of channels associated with video and/or audio devices during TME creation or TME Template creation. Rather than assign a specific channel to a device or control event, the present principles assigns a pool of channels to the event and allows the production system handle the allocation of those channels in an efficient manner without any user intervention required. Disclosure an exemplary embodiment of the auto channel assignment technique of the present principles provided hereinafter will be made in the IGNITE® Production system available from Thomson Grass Valley, Inc. Those of skill in the art will recognize however that the IGNITE® system is only one example of an automated television production system used in news automation environments, and that the principles of the present invention may be employed and integrated into other production systems without departing from the scope of this disclosure. Within the automated production system the term "IQ TME" is used to differentiate a standard TME with fixed data vs. a production event (IQT) that has expanded variable data that can be either manually changed or automatically changed during use.

Those of skill in the art will also recognize that a TME (Transition Macro Event) is logical grouping of device or control events that are arranged on a timeline that, when executed, sends commands to various devices to produce the desired television production event. Among these events is the assignment of channels for playout.

Figure 1:
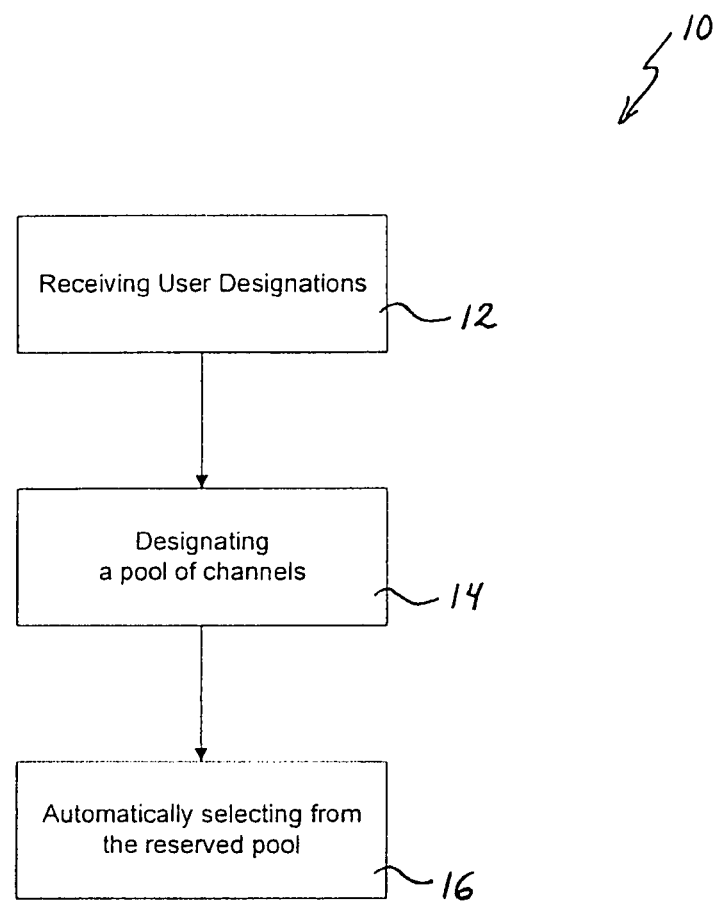
FIG. 1 depicts in flow chart form the steps of a method for assigning channels according to an implementation of the present invention.

FIG. 1 shows an overview flow chart of a method 10 of the present principles for auto channel assignment. Initially, user designations are received 12, which include the designation of a pool of channels (14). Once all designations have been set, and during the live production, a production system (not shown) will automatically select (16) from the pool of designated channels without requiring any further user intervention. For a detailed description of such production system, refer to U.S. Pat. No. 7,302,644 incorporated by reference. In this manner, if changes are made to the order of playout during the production, the system will automatically select from a pool of designated channels.

Running order changes can occur for many reasons. Generally this is an editorial decision by the show producer, but at times may need to be made by the director. Some examples of the reasons for running order changes could be as follows:
1. Producer may make changes to the running order, because a story or elements of the story are not ready;
2. Producer may make changes to the running order to adjust show timing (add and/or delete stories;
3. Producer may make changes to the running order for editorial reasons (they may want to change which anchor reads a story; and
4. A Director may change the running order, because one of the production elements is missing (missing clip, missing graphics, remote live shot not available.

When changes are made in the running order, there can be conflicts between production resources. For instance, assume a sequence of stories that each have a clip and server channel assigned (Page 1—Ch A, Page 2—Ch B, Page 3 Ch A), and the producer changes the running order to delete Page 2. A conflict will now exist with regard to the two stories (i.e., Page 1 & Page 3) back-to-back using the same playout Ch A. The Auto Channel assignment of the present principles will automatically re-assign the Page 3 to next available channel (the number of channels in the pool will determine what is considered the next available channel—e.g., in a two channel pool, then Ch B would be assigned).

Within a TME, multiple functions are affected by changing the server playout channel. The auto channel assignment of the present principles updates each area of these multiple functions (e.g., Control, Video, and Audio). For example, the device channel that the TME is controlling must be updated with the newly assigned channel. The video source associated with the device channel must be updated in the TME switching function. The audio source associated with the device channel must be updated in the TME audio function.

In order to implement the above-identified method, the present principles utilizes the concept of virtual devices for enabling the user to create the TME and designate a pool of channels.

Create (Auto) Virtual Device

Initially, the production system provides the user with means to create a virtual device in the TME Template. This means is generally an interface (e.g., graphical user interface—GUI) during the creation of TME Template in the production system. A virtual device can be created for various machine types (e.g., Servers, Graphics, Audio Servers, and video switcher Mix/Effects). In addition, those of skill in the art will recognize that multiple virtual device types may also be created for any of the exemplary machine types.

Virtual Device-Setup Channel Assignment

In addition to providing the user with means to create a virtual device, the TME Template interface also provides the user with the ability to assign physical channels to the virtual device. In accordance with one implementation, in creating the virtual device and enabling the assignment of the physical channels to the created virtual device, the following criteria must be met:

1) Channels must be of the same device type. Device type refers to the type of device as seen by the production system. For example, different graphics machines (with different manufactures) can be configured to be controlled by the production system. But while they are all graphics machines, they may not all have the same capabilities. So when a virtual channel pool is created in accordance with the present principles, the device type refers not to the brand of machine, but rather to the control functionality of the production system for that machine. For example, The Thomson Grass Valley IGNITE® production system can control a Deko graphics machine, available from Chyron of Hauppauge, N.Y. with Chyron Intelligent Interface, and it can control a Chyron Duet graphics device using the same protocol. These would be seen by the IGNITE® production system as a Graphic Device (with Chyron Intelligent Interface);

2) Devices must be of the same major type and have the same functionality to be assigned to a selected Virtual Device. For example one cannot assign a CG channel to a Video Server virtual device. (Note: This does not mean that they have to be the same device, but that they have the same functionality and that they can access the same media);

3) An (Auto) Virtual Device must have a minimum of two physical channels assigned or the (Auto) Virtual Device is considered inactive and the user is warned if the TME is recalled with this Virtual Device assigned;

4) Only active (Auto) Virtual Devices will be selectable from the various production system property pages;

5) Once a physical channel has been assigned to an (Auto) Virtual Device, it can not be assigned to another (Auto) Virtual Device; and 6) Once a physical channel has been assigned to an (Auto) Virtual Device, it is no longer listed as a selectable device in the machine control property page.

Support for Multiple Virtual Devices

As is often the case with live productions, there is a need to create multiple TMEs. As such, and according to an implementation of the present principles, there will be a need to create multiple virtual devices. Sometimes, there may be a need to create multiple virtual devices of the same type (two virtual servers "AutoVR1" & "AutoVR2") or one can create multiple virtual devices of different types (one server "AutoVR1" and one graphic "AutoGfx1"). For example, "AutoVR1" could have M-Series channels 1, 2, 3 assigned to it, and "AutoVR2" could have channels 1, 2, 3, 4 assigned to it.

Figure 2:
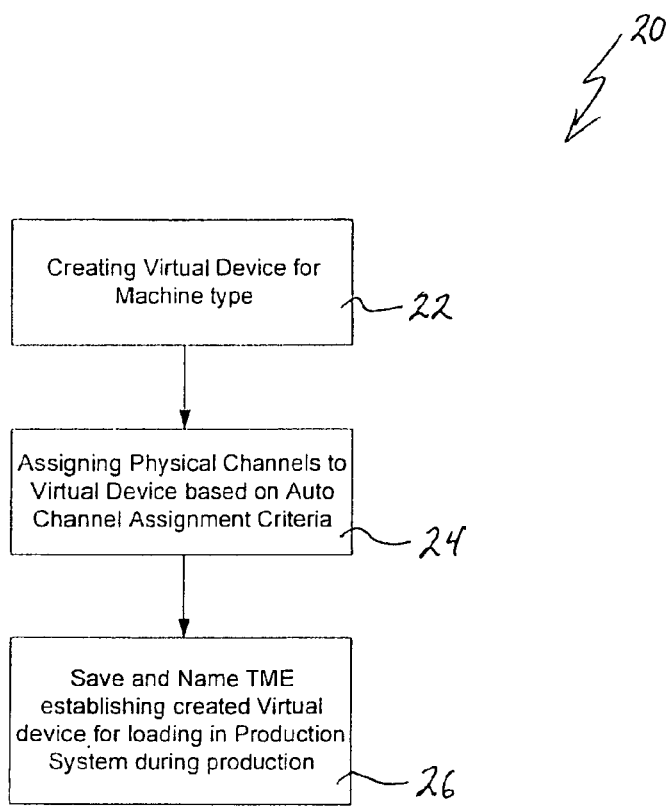
FIG. 2 depicts a more detailed flow chart of the method for assigning channels according to an implementation of the present invention.

FIG. 2 shows a little more detailed method 20 according to an implementation of the present principles. During the user designation step (step 12 of FIG. 1), the user creates the virtual device 22 for the respective machine type, and then during the designation of a pool of channels (step 14 of FIG. 1), the user actually assigns the physical channels to the virtual device (step 24) based on the above-identified criteria. Once the virtual device is created, the user can save and/or name the same (step 26) for later loading during the execution of a TME during a television or news production.

(Auto) Virtual Device (Channel Availability)

As mentioned above, the production system must manage when a channel is in use and when a channel is available. This will require tracking when a media source is On-air (Video or Audio) and the event (TME) order in relationship to the timeline cursor.

Figure 3:
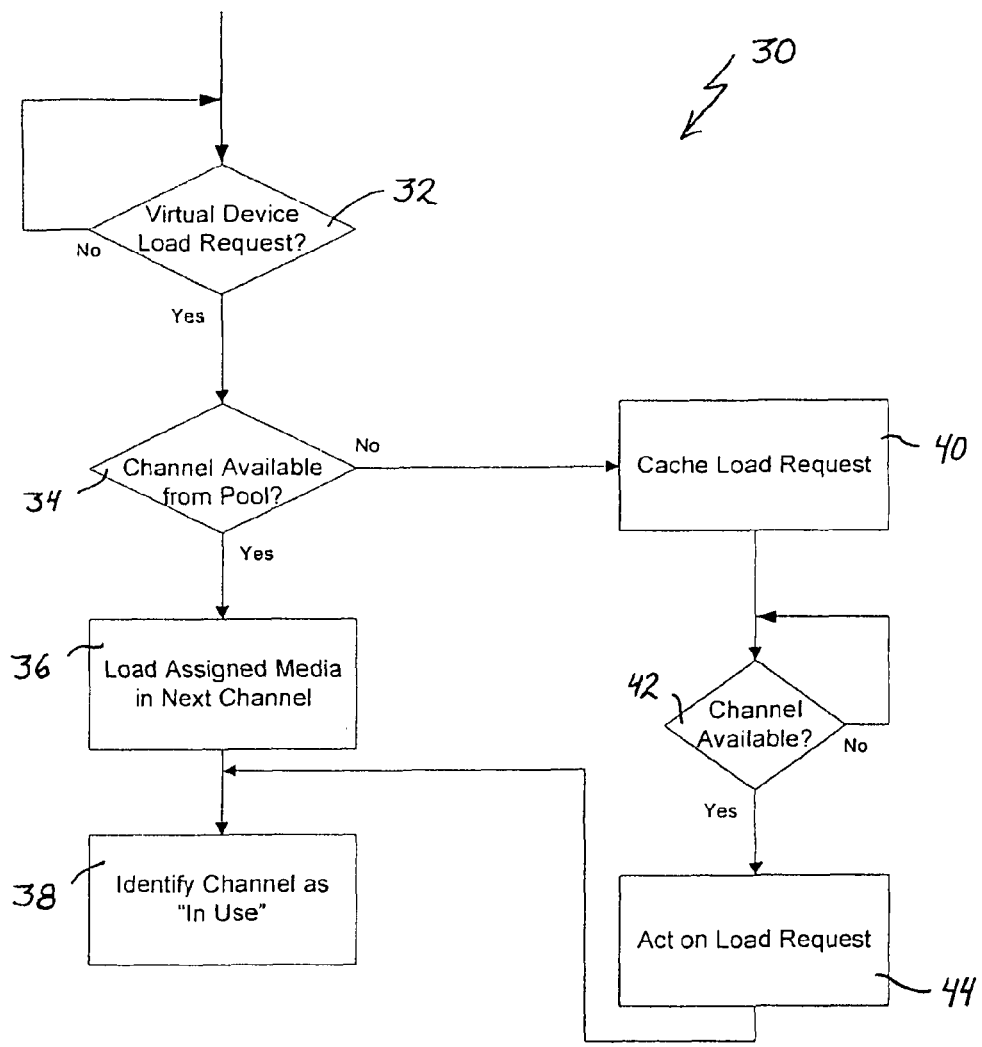
FIG. 3 depicts in flow chart the steps executed by a production system for assignment of channels in accordance with a virtual device request, according to an implementation of the present invention.

According to an implementation and referring to the example in FIG. 3, when the (Auto) Virtual Device load request is encountered (32), the production system determines (34) if a channel is available from the pool, and if so, then loads the assigned media ID in the next available physical channel (36). That channel is now considered "In Use" and identified as such (38), and is no longer available in the pool of channels until it is "Free".

The channel is "In Use" until the timeline cursor enters another TME AND the physical channel video or audio is not "On Air". Note: due to transition times of video and audio, there may be occasions when a Virtual Device load is requested but the channel is not available (at step 34) until the end of a video or audio transition. In this event, the load request is cached (40) and acted on (44) when the channel becomes free (as long as the production system timeline cursor is still in that TME) during a determination of channel availability 42. If more load requests are made than are available from the pool of channels, then the user will be warned.

(Auto) Virtual Device (Channel Rotation)

Those of skill in the art will recognize that the production system must manage the physical channel rotation of each virtual device. Channels will be rotated in the order they are assigned to the virtual device. For example a virtual device "AutoVR1" might have the following physical channels assigned:

-AUTOVR1;
Server ( )-Channel1;
Server ( )-Channel 2;
Server ( )-Channel 3: and
Server ( )-Channel 4.

When the production system timeline cursor hits the left edge of the first virtual device load object (i.e., the cursor hits the virtual device load request in the respective TME), then the first available physical channel is assigned. The production system will also load and assign available play out channels for media ID to the right of the system's timeline cursor. (Note: the user can define, at the system level, the maximum number of load commands to look ahead. The maximum number cannot exceed the (total # of channels—1) that have been assigned to the Virtual Device).

Figure 4:
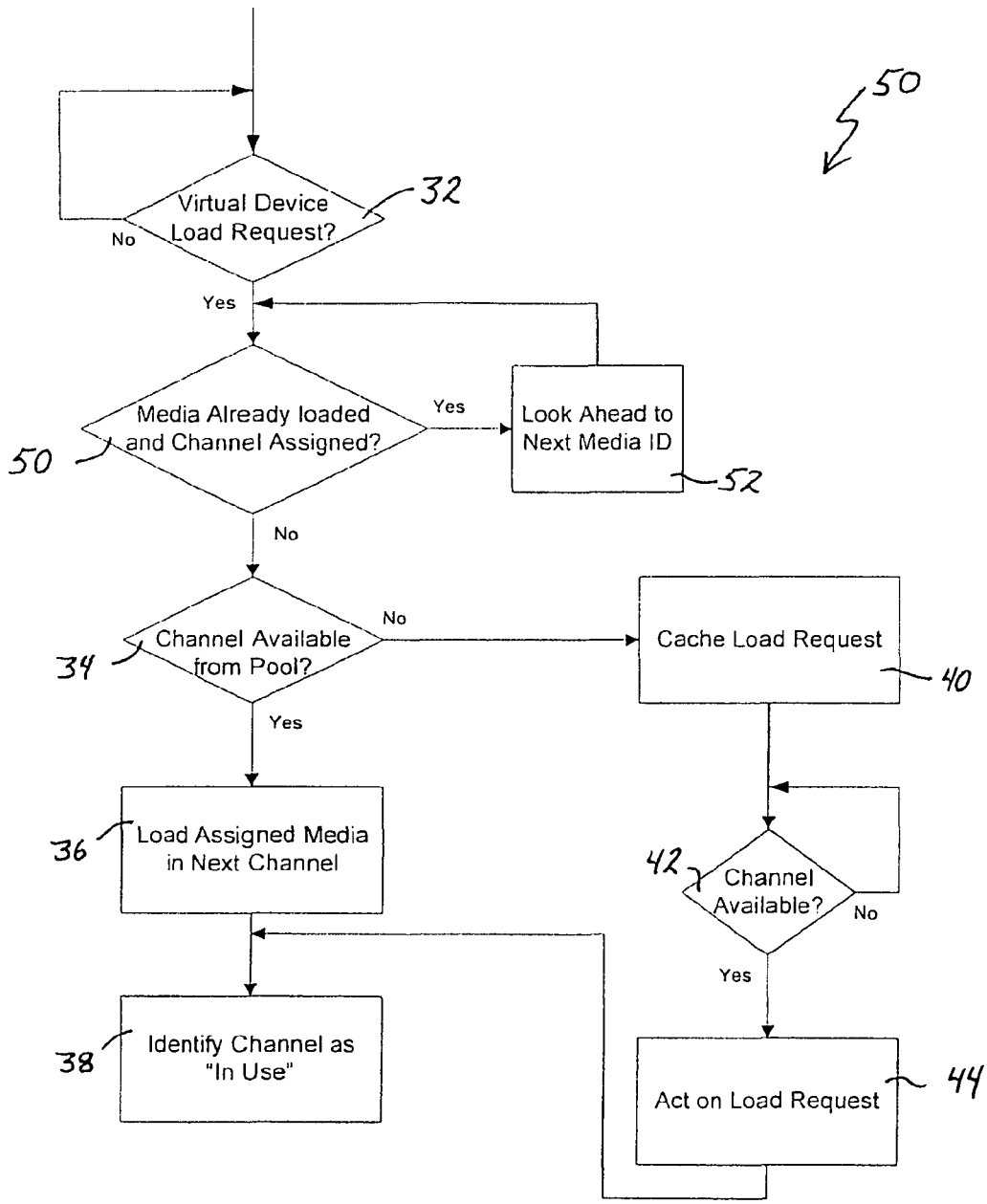
FIG. 4 depicts a more detailed flow chart of the production system assignment of channels in accordance with a virtual device load request, according to an implementation of the present invention.

Referring to the method 50 shown in FIG. 4, as the timeline cursor advances and encounters a virtual device load command (request) 32, it will determine if the media has already been loaded and a channel assigned (50), and if so, it will look ahead to load the next media ID (52) that has not been loaded (within the max limit) to the right of the production system timeline cursor. If the timeline cursor is moved to a Virtual Device load command/request (32) which media has not been loaded, then the production system will determine if a channel from the pool is available (34) and if so, will load the media and assign the next available physical channel (36) for that media ID and all media loads to the right of the production system timeline cursor (within the max limit). The remaining portion of FIG. 4 is the same as that described above in FIG. 3.

FIGS. 5a-5e, 6a-6c and 7a-7b show various examples of the "look ahead" aspect of the present principles. FIGS. 5a-5e shows various examples of a Sequence of Events "Look Ahead" load wherein a Sequential operation with the maximum look ahead is set to two (2). FIGS. 6a-6c show some examples of a Sequence of Events "Look Ahead" load associated with a Non-Sequential operation. FIGS. 7a-7c show alternative events for the examples shown in FIG. 6.

FIGS. 5a-5e illustrate the Auto-Channel assignment and Look Ahead functionality using sequential sequence of events. Each event represents what happens when the production system event timeline cursor advances to the next TME in a sequential order. FIG. 5a, event 1, shows 7 TMEs on the production system event timeline. The TME names are:

SOT ($1^{st}$ instance of the "Sound on Tape" TME);
VO ($1^{st}$ instance of the "Voice Over" TME);
CAM MCU ($1^{st}$ instance of the "Camera" TME);
SOT ($2^{nd}$ instance of the "Sound on Tape" TME);
CAM MCU ($2^{nd}$ instance of the "Camera" TME);
VO ($2^{nd}$ instance of the "Voice Over" TME); and
SOT ($3^{rd}$ instance of the "Sound on Tape" TME).

As shown, five (5) of the seven (7) TMEs have an Auto-Channel virtually assigned in accordance with an exemplary implementation of the present principles (e.g., 3-SOT, 2-VO). Each of the five Auto-Channel TMEs contains objects that control Video Switching, Audio Mixing, and Machine Control, which represent the three functions that are adjusted when a channel is assigned with the Auto-channel feature of the present principles.

The starting channel assignment of the server channels assigned by the Auto-channel feature of the present principles for each of the five TMEs is listed above the TME. Note, when a channel is assigned by the auto-channel feature of the present principles, the following events occur:

1) assignment of the channel to control to the Machine Control;

2) assignment of the associated Video source for the assigned channel to any field within a Video Switcher Control that has the Auto-channel feature; and 3) assignment of the associated Audio source for the assigned channel to any audio action within the Audio Control that has the Auto-channel feature.

SOT ($1^{st}$ instance)—Server Channel 1 is assigned to the two (2) Machine Control Objects for Load & Play. Channel 1's associated video source is assigned to the Video Switcher Control—P/P Preview Bus, and channel 1's associated audio source is assigned to the Audio Control—Full Action.

VO ($1^{st}$ instance)—Server Channel 2 is assigned to the two (2) Machine Control Objects for Load & Play. Channel 2's associated video source is assigned to the Video Switcher Control—P/P Preview Bus, and channel 2's associated audio source is assigned to the Audio Control—Under Action (which brings the clip sound at a designated position to have a level lower than the sound full).

SOT ($2^{nd}$ instance)—Channel 3 is assigned to the two (2) Machine Control Objects for Load & Play. Channel 3's associated video source is assigned to the Video Switcher Control—P/P Preview Bus, and channel 3's associated audio source is assigned to the Audio Control—Full Action.

VO ($2^{nd}$ instance)—is unassigned, as the Max Look Ahead is set to two (2)—which means auto-channel will only assign a channel the next two TMEs past the current TME (defined by the current location of the production system Event Timeline Cursor).

SOT ($3^{rd}$ instance)—is unassigned, as the Max Look Ahead is set to two (2).

The description to the right of Event 1 list the channels assigned to the auto-channel pool and their current assignment state (e.g., in Event 1, Channels 1, 2, and 3 are assigned to TME, and Channel 4 is not assigned.)

FIG. 5b (Event 2) shows the same 7 TMEs, live of which are auto-channel TMEs as the previous event and what happens when the production system Event Timeline Cursor advances to the next TME—(VO 1st instance).

SOT (1st instance)—is on-the air with Server Channel 1;
VO (1st instance)—loads the assigned clip into Server Channel 2;
SOT (2nd instance)—Server Channel 3 is still assigned;
VO (2nd instance)—Server Channel 4 is assigned; and
SOT (3rd instance)—is unassigned.

The description to the right of Event 2 lists the channels assigned to the auto-channel pool and their current assignment state (e.g., in Event 2, All channels are assigned to TME).

FIG. 5c (Event 3) shows the same 7 TMEs as the previous event, and what happens when the production system Event Timeline Cursor advances to the next TME (Camera Master Control Unit (CAM MCU) 1st instance).

SOT (1st instance) is off air, which frees up Server channel 1;
VO (1st instance)—is on air with Server Channel 2;
SOT (2nd instance)—Server Channel 3 is still assigned;
VO (2nd instance)—Server Channel 4 is still assigned; and
SOT (3rd instance)—is unassigned, as the Max Look Ahead is two (2) and this TME is the third auto-channel TME to the right of the current TME (based on the current location of the Ignite Event Timeline Cursor).

The description to the right of Event 3 lists the channels assigned to the auto-channel pool and their current assignment state. (In Event 3, Channels 2, 3, 4 are assigned to TME, and channel 1 is available).

FIG. 5d (Event 4) shows the same 7 TME as the previous event, and what happens when the production system Event Timeline Cursor advances to the next TME (SOT 2nd instance).

SOT (1st instance) is off air;
VO (1st instance)—is off air, which frees up Server channel 2;
SOT (2nd instance)—the assigned clip is loaded in Server Channel 3;
VO (2nd instance)—Server Channel 4 is still assigned; and
SOT (3rd instance)—Server Channel 1 is assigned.

The description to the right of Event 4 list the channels assigned to the auto-channel pool and their current assignment state (e.g., in Event 4, Channels 1, 3, 4 are assigned to TME, and channel 2 is available).

FIG. 5e (Event 5) shows the same 7 TME as the previous event, and what happens when the production system Event Timeline Cursor advances to the next TME (CAM MCU 2nd instance):

SOT (1st instance) is off air;
VO (1st instance)—is off air;
SOT (2nd instance)—Server Channel 3 is on air;
VO (2nd instance)—Server Channel 4 is still assigned; and
SOT (3rd instance)—Server Channel 1 is still assigned.

The description to the right of Event 5 list the channels assigned to the auto-channel pool and their current assignment state (e.g., in Event 5, Channels 1, 3, 4 are assigned to TME, and channel 2 is available).

FIGS. 6a-6c illustrate the Auto-channel assignment and Look Ahead functionality using a non-sequential sequence of events. Each event represents what happens when the production system Event Timeline Cursor advances to the next TME or jumps out of TME sequential order.

FIGS. 6a and 6b are the same TMEs as shown in FIGS. 5a and 5b, for Event 1 and Event 2, respectively (with the same rules of channel assignment and operation).

FIG. 6c shows Event 3 which shows a break in executing TME and skipping to SOT ($2^{nd}$ instance):

SOT (1st instance) is on air;
VO (1st instance)—is off air and to the left of the Ignite Event Timeline Cursor, which frees up Server Channel 2;
SOT (2nd instance)—Server Channel 3 is still assigned;
VO (2nd instance)—Server Channel 4 is still assigned; and
SOT (3rd instance)—is assigned Server Channel 2.

The description to the right of Event 3 lists the channels assigned to the auto-channel pool and their current assignment state (e.g., in Event 3, All Server Channels are assigned to a TME).

FIG. 7 illustrates the Auto-channel assignment and Look Ahead functionality using a non-sequential sequence of events for alternate Events 3 and 4. Each event represents what happens when the production system Event Timeline Cursor advances to the next TME or jumps out of TME sequential order.

FIGS. 7a and 7b show the same TME as shown in FIG. 6c, but shows a different version of skipping (with the same rules of channel assignment and operation).

FIG. 7a (Alternate Event 3) shows a break in executing TME and skipping to SOT ($3^{rd}$ instance):

SOT (1st instance) is on air;
VO (1st instance)—is off air and to the left of the Ignite Event Timeline Cursor, which frees up Server Channel 2;
SOT (2nd instance)—is off air and to the left of the Ignite Event Timeline Cursor, which frees up Server Channel 3;
VO (2nd instance)—is off air and to the left of the Ignite Event Timeline Cursor, which frees up Server Channel 4; and
SOT (3rd instance)—is assigned Server Channel 2.

The description to the right of Event 3 lists the channels assigned to the auto-channel pool and their current assignment state (In Event 3, Channels 1, 2 are assigned to TME, and Channels 3, 4 are not assigned).

FIG. 7b (Alternate Event 4) shows a break in executing TME and skipping back to VO ($1^{st}$ instance):

SOT (1st instance) is on air;
VO (1st instance)—Server Channel 2 is assigned;
SOT (2nd instance)—Server Channel 3 is assigned;
VO (2nd instance)—Server Channel 4 is assigned; and
SOT (3rd instance)—is unassigned, as the Max Look Ahead is set to (2).

The description to the right of Event 4 lists the channels assigned to the auto-channel pool and their current assignment state (e.g., in Event 4, All Channels are assigned to TME).

Additional Features with Production System Templates

According to another implementation, the user can create global tables within a Template that can link the auto channel to any associated properties on other devices. For example, a table can be set up to link a video source with an associated audio source so that when the channel is assigned by the production system, the audio will follow as well.

The user will have the option to bring any audio sources associated with the pooled video sources that are NOT in use, to off. This is to facilitate the switching of auto channel video sources where the user may have other non-associated audio in a TME that they wish to keep on air. This would most commonly be used in a VO-SOT-VO-SOT situation where an anchor microphone needs to be kept on air while the SOT would bring on air and off air the appropriate audio sources based on the assigned channel.

It is to be understood that the present principles may be implemented in various forms of hardware, software, firmware, special purpose processors, or a combination thereof. Preferably, the present principles may be implemented as a combination of hardware and software. Moreover, the software is preferably implemented as an application program tangibly embodied on a program storage device. The application program may be uploaded to, and executed by, a machine comprising any suitable architecture. Preferably, the machine is implemented on a computer platform having hardware such as one or more central processing units (CPU), a random access memory (RAM), and input/output (I/O) interface(s). The computer platform also includes an operating system and microinstruction code. The various processes and functions described herein may either be part of the microinstruction code or part of the application program (or a combination thereof) that is executed via the operating system. In addition, various other peripheral devices may be connected to the computer platform such as an additional data storage device and a printing device.

It is to be further understood that, because some of the constituent system components and method steps depicted in the accompanying Figures are preferably implemented in software, the actual connections between the system components (or the process steps) may differ depending upon the manner in which the present principles is programmed. Given the teachings herein, one of ordinary skill in the related art will be able to contemplate these and similar implementations or configurations of the present principles.

While there have been shown, described and pointed out fundamental novel features of the present principles, it will be understood that various omissions, substitutions and changes in the form and details of the methods described and devices illustrated, and in their operation, may be made by those skilled in the art without departing from the spirit of the same.

For example, it is expressly intended that all combinations of those elements and/or method steps which perform substantially the same function in substantially the same way to achieve the same results are within the scope of the present principles. Moreover, it should be recognized that structures and/or elements and/or method steps shown and/or described in connection with any disclosed form or implementation of the present principles may be incorporated in any other disclosed, described or suggested form or implementation as a general matter of design choice. It is the intention, therefore, to be limited only as indicated by the scope of the claims appended hereto.

The invention claimed is:

1. A method for assigning channels in an automated production apparatus, comprising the steps of:
    receiving a user designation of a virtual device within the automated production apparatus using a command template;
    reserving a pool of channels for use by the user-designated virtual device;
    automatically selecting from the pool of reserved channels a channel for use by the device in response to a control event causing execution of at least operation by the virtual device, where said automatically selecting further comprises:
    determining whether media has been loaded and a channel assigned in response to a device load request; and
    looking ahead to next media IDs when media has already been loaded and a channel has been assigned.

2. The method according to claim 1, wherein said reserving step further comprises:
    assigning physical channels to the virtual device based on at least one auto channel assignment criteria; and
    saving and naming a transition macro event (TME) corresponding to the created virtual device for subsequent loading into the automated production system during a production.

3. The method according to claim 2, wherein said at least one auto channel assignment criteria comprises the physical channels be of the same device type.

4. The method according to claim 2, wherein said at least one auto channel assignment criteria comprises that the devices be of the same major type and have the same functionality.

5. The method according to claim 2, wherein said at least one auto channel assignment criteria requires a minimum of two physical channels must be assigned.

* * * * *